United States Patent [19]

Hu et al.

[11] Patent Number: 5,178,765
[45] Date of Patent: Jan. 12, 1993

[54] HYDROPHILIC MEMBRANES PREPARED FROM POLYETHERSULFONE/POLY-2-OXAZOLINE/POLYVINYLPYRROLIDONE BLEND

[75] Inventors: Hopin Hu; Inessa Katsnelson, both of Ann Arbor; Xiaosong Wu, Ypsilanti, all of Mich.

[73] Assignee: Gelman Sciences Inc., Ann Arbor, Mich.

[21] Appl. No.: 810,234

[22] Filed: Dec. 19, 1991

Related U.S. Application Data

[63] Continuation-in-part of Ser. No. 761,555, Sep. 18, 1991, abandoned.

[51] Int. Cl.⁵ .............................................. B01D 61/14
[52] U.S. Cl. ............................... 210/651; 210/500.41; 264/41
[58] Field of Search .............. 210/651, 500.39, 500.41, 210/500.23, 490, 652; 525/66, 186, 490; 264/41, 49; 427/245, 246

[56] References Cited

U.S. PATENT DOCUMENTS 4,678,833 7/1987 McCreedy et al. ................. 525/66
4,704,324 11/1987 Davis et al. ........................ 428/308
4,900,449 2/1990 Kraus et al. ....................... 264/41 X

OTHER PUBLICATIONS

A New Water- and Organic-Soluble Adhesive, Chiu et al., Advances in Chemistry Series 213, pp. 425-544, American Chemical Society, 1986.

*Primary Examiner*—Frank Spear
*Attorney, Agent, or Firm*—Krass & Young

[57] ABSTRACT

Porous blended hydrophilic copolymer (polyethersulfone resin, poly-2-oxazoline resin, and polyvinylpyrrolidone resin) microporous membranes are provided which are useful for filtering macromolecules or particles from fluids. The invention also concerns a process for filtering matter from a fluid, employing the membranes.

20 Claims, No Drawings

HYDROPHILIC MEMBRANES PREPARED FROM POLYETHERSULFONE/POLY-2-OXAZOLINE/- POLYVINYLPYRROLIDONE BLEND

RELATED APPLICATION

This is a continuation-in-part application of U.S. patent application Ser. No. 761,555, filed Sep. 18, 1991, now abandoned.

FIELD OF THE INVENTION

The invention relates to novel hydrophilic microporous membranes, more particularly, high strength, low melting point membranes which may be cast from a blend of polyethersulfone (PES) polymer, poly-2-oxazoline and polyvinylpyrrolidone resin. The invention also concerns both a process for preparing porous membranes and a process for filtering a fluid through such a porous filtration membrane.

BACKGROUND OF THE INVENTION

Microporous membranes are generally defined as thin walled structures having an open spongy morphology with a narrow pore size distribution. The mean pore size for microporous membranes typically range from 0.01 $\mu$m to 10 $\mu$m. Traditionally, microporous membranes are used to remove fine particulate matter such as dust and bacteria from liquids and gases. The filtration mechanism is believed to be a combination of size exclusion and absorption/adsorption on the walls of the pores inside the membrane. In general, the smaller the pore size of membrane, the slower the rate of membrane at which a filtrate can be passed. To be considered "microporous", the typical inner width of the membrane pores is in the range that passes macromolecules and retains particles contained in a fluid. Below this range, are "ultrafiltration" (UF) membranes which serve to retain macromolecules such as albumin, and "reverse osmosis" (RO) membranes which serve to separate ions. To be useful for a particular application, the fluid flow rate through the membrane must be reasonably high.

In aqueous microfiltration such as the production of particle free water or solutions in electronics, beverage, and pharmaceutical industries, it is highly desirable to use filtration membranes which have as little leachable material as possible. Also it is desired that the membranes be easily wettable by water or aqueous solutions. Therefore, membranes which are inherently water wettable are often preferred over hydrophobic membranes post-treated by a wetting agent. Thus, hydrophobic membranes are commonly made wettable by adding a wetting agent. Upon use of the treated hydrophobic membranes, however, there is a risk that wetting agent may be leached by the solution being filtered. Such leaching, in turn, may result in contamination of the filtrate.

Polyethersulfone (PES) resin has been used to prepare microporous membranes as described in U.S. Pat. No. 4,900,449. The membranes contain polyvinylpyrrolidone (PVP) and polyethylene glycol (PEG) as non-leachable, intrinsic wetting agents and therefore are hydrophilic. Recently, a new microporous membrane comprising PES resin and phenoxy resin has been developed as described in copending U.S. patent application Ser. No. 531,237. This membrane has a substantially higher strength than the membrane made with only PES resin, and can be readily used in disc form as a housed porous filter membrane component, in a melt-compatible thermoplastic device for the membrane such as a device of the type disclosed in U.S. Pat. No. 4,444,661. Despite the unexpectedly high strength, this membrane is however, hydrophobic.

Polyethersulfone has been shown to be miscible in a common solvent (dimethylformamide or dimethylsulfoxide), with phenoxy resin (V.B. Singh and D.J. Walsh, J. Macromol, Sci.-Phys., B25 (1 & 2), 65-87, 1986). Also shown is that the melting temperature of cast films of blended PES/phenoxy resin is lowered by using more phenoxy resin (relative to PES) in the blend. Not suggested is a membrane made from such a blend nor was such a film suggested to be porous or to be useful as a filtration membrane.

Poly-2-oxazoline, more particularly poly(2-ethyl-2-oxazoline), is described as being a water soluble adhesive by Chiu et al., Advances in Chemistry Series 213, pp. 425-433, American Chemical Society, 1986. Poly-2-oxazoline is used to blend with various thermoplastics to prepare membranes for use in separating components of liquid mixtures such as water/ethanol or ethanol/-hexane mixtures as described in U.S. Pat. No. 4,678,833. In this patent, it is reported that the membranes made from poly-2-oxazoline are sometimes extractable from miscible blends with alcohol or alcohol/water mixtures. Therefore, such leaching may not only result in contamination of the filtrate, but also cause the membrane to be non-wettable when re-used in aqueous solutions.

SUMMARY OF THE INVENTION

In accordance with the present invention, there are provided microporous membranes comprising a homogeneous blend of PES resin, poly-2-oxazoline resin, and polyvinylpyrrolidone (PVP) resin. The membranes are unique in that they are hydrophilic and possess exceedingly high strength, even after exhaustive alcohol extraction. The invention further provides a method of making the membranes comprising the steps of dissolving the resins in a solvent to form a polymer solution, forming a thin film of the polymer solution, precipitating the polymer as a microporous membrane, and drying the microporous membrane.

DETAILED DESCRIPTION OF THE INVENTION

The invention in one preferred aspect concerns porous filtration membranes having a porous matrix which preferably is isotropic, which membranes are microporous membranes. The matrix comprises a homogeneous blend of PES resin, poly-2-oxazoline resin, and PVP resin.

The preferred PES resin (sold under the trade name Victrex, ICI Corp.; or Ultrason E, BASF Corp.) has the molecular structure I:

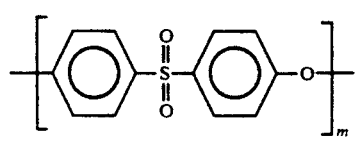

where m is an integer in the range from 50 to 150.

The preferred poly-2-oxazoline resin is poly-2-ethyl-2-oxazoline resin (sold under the trade name PEOX ®, Dow Chemicals; or Aquazol ®, Polymer Chemistry Innovations, Inc.). Poly-2-oxazoline resin has the general structure II:

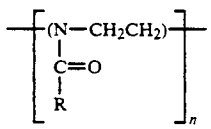

where R is an alkyl group, preferably a $C_{1-4}$ alkyl group, more preferably an ethyl group, or an aryl group, preferably a phenyl group, and n is an integer in the range of 500 to 5,000.

The preferred PVP resin (sold under the trade name Plasdone ® K-90, GAF Chemical Corporation) has a molecular weight of 700,000. The PVP resin has the general structure III:

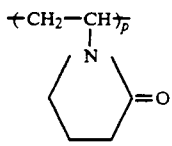

where p is an integer in the range from 360 to 6300.

A preferred membrane is one wherein the matrix blend comprises about 70 to 79 wt. % of PES resin, about 18 to 23 wt. % of poly-2-ethyl-2-oxazoline resin, and about 3% to 7% of PVP resin based upon the total amount of these resins included in the blend. In the preferred relative amounts, we found that the softening or melting temperature of the membrane is lower and also the membrane strength is unexpectedly higher than that of a comparable membrane made only with PES resin. In addition, the membrane so prepared is hydrophilic and such hydrophilicity will stay unchanged even after exhaustive extraction with water or alcohol such as ethanol or isopropanol (IPA), or extensive heat treatments. Control experiments in which similar membranes were prepared from polymer solutions lacking PVP were also conducted. We found that unlike the polyethersulfone/poly-2-oxazoline/PVP membrane, these membranes lost their hydrophilicity considerably after exhaustive extraction with alcohols. Thus, blending PES with poly-2-ethyl-2-oxazoline and PVP in a polymer membrane formulation indeed results in a strong, hydrophilic membrane matrix which has an unexpected advantage over a polyethersulfone/poly-2-oxazoline blend membrane. Literature data on the thermal properties of the above described polymers are detailed in Table I.

TABLE I

| Polymer | Glass Transition Temperature Tg | Softening Temperature |
|---|---|---|
| Polyethersulfone[a] | 226° C. | 226° C. |
| Phenoxy Resin[b] | 91° C. | 100° C. |
| Poly-2-ethyl-2-oxazoline[c] | 70° C. | 70° C. |

[a]Victrex ® PES - 5200P, ICI Corp.
[b]Ucar ® - Phenoxy Resin PKHH, Union Carbide Corp.
[c]PEOX ® - Dow Chemical Corp.

The invention in another preferred aspect concerns a method of preparing a microporous membrane including the steps of forming a solution of a blend of PES resin, poly-2-oxazoline resin, and PVP resin in a suitable solvent, preferably such as N-methylpyrrolidone, dimethylformamide, or mixtures thereof. Any of various suitable art-recognized additives or solvent mixtures may be included in the polymer solution, of which polyethylene glycol is preferred. A thin film is formed of the polymer solution. The polymer is precipitated as a microporous membrane and dried.

In general, the polymer solution is cast on a moving stainless-steel belt and subjected to conditions of controlled air velocity, belt temperature, and relative humidity. The liquid film of the polymer imbibes sufficient water to affect initial precipitation of the polymer from the solvent. Final precipitation, which forms the microporous membrane, occurs in a quench bath which contains a strong non-solvent such as water. The formed microporous membrane may subsequently be dried in an oven.

In another preferred aspect, the invention concerns a process for filtering an aqueous fluid comprising causing said fluid to flow through a microporous filtration membrane as described having a matrix comprising a homogeneous blend of PES, poly-2-ethyl-2-oxazoline resin, and PVP resin. As a result of the enhanced strength of the matrix comprising PES/poly-2-ethyl-2-oxazoline/PVP, the membrane can be made thinner, i.e. of a selected thickness that still provides suitable strength, which results in reducing the hydrodynamic resistance and imparts a faster water flow rate and a higher level of throughput to the membrane.

The invention and the best mode of practicing the same are illustrated by the following examples of preferred embodiments of the invention.

DEFINITIONS

Water Bubble Point: The water bubble point is a test to measure the largest pore size of a membrane, based on the air pressure necessary to force liquid from the pores of a wetted membrane. The larger the pore, the less pressure to vacate it. Air passing through the empty pore is detected as bubbles. The differential pressure to force the first bubble out is defined as the bubble point. The relationship between the bubble point pressure and the diameter of the large pores is given by:

$$\text{Bubble point pressure} = \frac{Br\cos\theta}{D}$$

where B is a constant, r is liquid-air surface tension, $\theta$ is the liquid-solid contact angle, and D is pore diameter.

Water Flow Rate: The water flow rate is the flow rate of water passing through the membrane of given dimension, commonly expressed in seconds at a given pressure per a given volume of water.

EXAMPLE 1

Preparation of Polymer Films

Solutions of 10% wt PES (Victrex ® 5200 P, ICI), and of 9% wt PES and 1% Wt Poly-2-ethyl-2-oxazoline (PEOX ®-200, Dow Chemical) in dimethylformamide were separately prepared. The homogeneous polymer solutions were then separately cast on a glass plate in 10 mil thickness, and oven dried at 120° C. to form thin films. Tests of the films for tensile strength and elongation indicated that the PES/poly-2-ethyl-2-oxazoline film was significantly stronger than the PES film. The results are shown below.

| Property | PES Film | PES/poly-2-ethyl-2-oxazoline Film |
|---|---|---|
| Tensile Strength at Break (psi) | 2,000 | 6,050 |
| Elongation at Break (%) | 0.2 | 2.5 |

EXAMPLE 2

Preparation of 0.2 μm Hydrophilic Polyethersulfone Membrane

Polyethylsulfone (Victrex ® 5200P, ICI), dimethylformamide, polyethylene glycol, and polyvinylpyrrolidone were mixed in the ratio of 13: 20: 66.8: 0.2. The mix was stirred at ambient temperature to homogeneity and cast at 10–12 mil on a glass or stainless steel plate, then the polymer solution was subjected to 60% relative humidity ambient air until it became opaque. The membrane was then immersed in water to complete coagulation, excess solvent was leached out for 2–12 hours, and the membrane was finally dried at 70° C.

The membrane obtained was instantly water wettable and exhibited 100% bacteria retention when challenged with $10^7/cm^2$ of Pseudomonas diminuta. The membrane had the following characteristics:

| | |
|---|---|
| Water Bubble Point | 58 psi |
| Water Flow Rate | 22 seconds/9.62 $cm^2$ - 100 mL at 10 psi |

EXAMPLE 3

Preparation of 0.8 μm Hydrophilic Polyethersulfone Membrane

Polyethersulfone, dimethylformamide, polyethylene glycol, and polyvinylpyrrolidone were mixed in the ratio of 12.5: 23: 64.3: 0.2. The membrane was cast and set as in example 2. The membrane so made was hydrophilic and showed the following characteristics:

| | |
|---|---|
| Water Bubble Point | 24 psi |
| Water Flow Rate | 4 seconds/9.62 $cm^2$ - 100 mL at 10 psi |

EXAMPLE 4

Preparation of 0.2 μm Hydrophobic Polyethersulfone/Phenoxy Membrane

The phenoxy resin (UCAR ® Phenoxy Resin PKHH, Union Carbide) was first added to dimethylformamide and stirred until dissolved. The PES resin was dispersed in polyethylene glycol to which the phenoxy solution was added. The final composition ratio of phenoxy resin, PES, dimethylformamide, and polyethylene glycol was 4: 10: 20: 66. The resulting clear polymer mix was cast in 15 mil thickness on a flat plate subjected to humidity, and finally oven dried at 70° C.

The membrane obtained was hydrophobic and showed the following performance:

| | |
|---|---|
| Water Bubble Point (prewet in methanol) | 62 psi |
| Water Flow Rate (prewet in methanol) | 28 seconds/9.62 $cm^2$ - 100 mL at 10 psi |

EXAMPLE 5

Preparation of 0.2 μm Hydrophilic Polyethersulfone/Poly-2-Ethyl-2-Oxazoline/PVP Membrane Poly-2-ethyl-2-oxazoline (PEOX ®, Dow Chemical) was dissolved in dimethylformamide with agitation. The PES resin and PVP resin (Plasdone ® K-90, GAF Chemicals Corp.) were evenly dispersed in polyethylene glycol to which a poly-2-ethyl-2-oxazoline solution was added with stirring. The composition of poly-2-ethyl-2-oxazoline, dimethylformamide, polyethersulfone, PVP and polyethylene glycol in the resulting mix was 1.5: 20.5: 13: 0.5: 64.5. The homogeneous mix was cast to form a microporous membrane by a procedure similar to that described in Example 4. The membrane so prepared was hydrophilic. After Soxhlet extraction using ethanol for 8 hours, 100° C. water boiling for 30 minutes, or 121° C. autoclaving for 45 minutes, the membrane did not lose its instant water wettability and performance. The membrane performance was:

| | |
|---|---|
| Water Bubble Point | 60 psi |
| Water Flow Rate | 24 seconds/9.62 $cm^2$ - 100 mL at 10 psi |

EXAMPLE 6

Preparation of 1.2 μm Hydrophilic Polyethersulfone/Poly-2-Ethyl-2-Oxazoline/PVP Membrane Poly-2-ethyl-2-oxazoline (Aquazol ®-500, Polymer Chemistry Innovations Inc.) was dissolved in dimethylformamide with agitation. Then the PES resin was dispersed in polyethylene glycol containing polyvinylpyrrolidone to which poly-2-ethyl-2-oxazoline solution was added with stirring. The ingredient composition of poly-2-ethyl-2-oxazoline, dimethylformamide, polyethersulfone, polyethylene glycol, and polyvinylpyrrolidone in the resulting mix is 2: 23.3: 8.5: 65.6: 0.6. The membrane was cast and set as in Example 4. The membrane so prepared was instantly water wettable and did not change its hydrophilicity and membrane performance after isopropanol-Soxhlet extraction for 30 hours, 100° C. water boiling for 30 hours, or 3 cycles of 121° C. autoclaving for 45 minutes. The membrane performance was as follows:

| | |
|---|---|
| Water Bubble Point | 9.5 psi |
| Water Flow Rate | 4 seconds/9.62 $cm^2$ - 250 mL at 10 psi |

EXAMPLE 7

Preparation of 1.2 μm Polyethersulfone/Poly-2-Ethyl-2-Oxazoline Membrane

Poly-2-ethyl-2-oxazoline (Aquazol ®-500, Polymer Chemistry Innovations Inc.) was dissolved in dimethylformamide with vigorous agitation. Then PES resin was dispersed in polyethylene glycol containing PVP to which poly-2-ethyl-2-oxazoline solution was added with agitation. The ingredient composition of poly-2-ethyl-2-oxazoline, dimethylformamide, polyethersulfone, and polyethylene glycol in the resulting mix is 2:23.3:8.5:66.2. The membrane was cast and set as in Example 4. The membrane so made was initially water wettable. However, it lost its hydrophilicity to a certain extent after isopropanol- or ethanol-Soxhlet extraction for 16 hours. The initial performance of the membranes was:

| | |
|---|---|
| Water Bubble Point | 9.0 psi |
| Water Flow Rate | 3.8 seconds/9.62 cm$^2$ - 250 mL at 10 psi |

EXAMPLE 8

Preparation of 1.2 μm Polyethersulfone/Poly-2-Ethyl-2-Oxazoline Membrane

This membrane was prepared in the same manner as in Example 7 except that the ingredient composition of poly-2-ethyl-2-oxazoline, dimethylformamide, polyethersulfone, and polyethylene glycol in the resulting mix was 4:23.3:8.5:64.2. The membrane so prepared was instantly water wettable initially. However, it lost its water wettability to a certain extent after isopropanol- or ethanol-Soxhlet extraction for 40 hours. The membrane initial characteristics was:

| | |
|---|---|
| Water Bubble Point | 9.5 psi |
| Water Flow Rate | 4.5 seconds/9.62 cm$^2$ - 250 mL at 10 psi |

EXAMPLE 9

Comparative Membrane Performance

The membranes prepared in Examples 2, 3, 4, 5 and 6 were compared for their relative performance characteristics with the typical results tabulated as follows:

TABLE II

| | MEMBRANE PREPARED IN EXAMPLE | | | | |
|---|---|---|---|---|---|
| PROPERTY | 2 | 3 | 4 | 5 | 6 |
| Wettability | Yes | Yes | No | Yes | Yes |
| Burst Strength (psi) | 25 | 20 | 34 | 36 | No Burst |
| Tensile Strength at Break in Parallel (psi) | 598 | 450 | 742 | 1,023 | 800 |
| Tensile Strength at Break in Perpendicular (psi) | 474 | 340 | 556 | 799 | 600 |
| Elongation at Break in Parallel (%) | 41 | 25 | 21 | 21 | 25 |
| Elongation at Break in Perpendicular (%) | 31 | 29 | 37 | 25 | 35 |

These data clearly indicate that the 0.2 μm PES/poly-2-ethyl-2-oxazoline/PVP membrane has a higher strength than the PES membrane or the PES/phenoxy membrane of the same pore size (see Examples 2, 4, and 5). Also, the data show that the 1.2 μm PES/poly-2-ethyl-2-oxazoline/PVP membrane is even stronger than the 0.8 μm membrane made with PES/PVP only (see Examples 3 and 6).

Further, the data show that the membranes of the present invention (Examples 5 and 6) were significantly stronger than the conventional membranes (Examples 2 and 3) with respect to burst strength and tensile strength (both parallel and perpendicular).

EXAMPLE 10

COMPARATIVE MEMBRANE WETTABILITY

The membranes made in Examples 6, 7, and 8 were compared for their relative water wettability and were found to have the representative results shown below.

TABLE III

| | MEMBRANE PREPARED IN EXAMPLE | | |
|---|---|---|---|
| PROPERTY | 6 | 7 | 8 |
| Initial wettability | instant | instant | instant |
| Wettability after IPA-Soxhlet extraction for 16 hours | instant | hydrophobic | 7 seconds |
| Wettability after IPA-Soxhlet extraction for 40 hours | instant | hydrophobic | partially hydrophobic |
| Wettability after EtOH-Soxhlet extraction for 16 hours | instant | partially hydrophobic | 3 seconds |
| Wettability after EtOH-Soxhlet extraction for 40 hours | instant | partially hydrophobic | partially hydrophobic |

The data shown in this table indicate that each membrane which lacks PVP (see Examples 7 and 8) significantly lost its hydrophilicity whereas the membrane containing PVP according to the invention (Example 6) still retained its instant hydrophilicity after extensive leaching in alcohols. This demonstrates that the presence of PVP in a membrane according to the invention is essential for long-term water wettability of the membrane.

We claim:

1. A hydrophilic filtration membrane that is instantly water wettable and has a microporous matrix comprising a homogeneous blend of polyethersulfone resin, poly(2-alkyl or aryl)-2-oxazoline resin, and polyvinylpyrrolidone resin, the polyvinylpyrrolidone resin being present in a non-leachable amount sufficient to make the membrane instantly water wettable even after prolonged extraction with alcohol.

2. The membrane of claim 1 wherein the polyethersulfone comprises resin having the formula I $$[(C_6H_4-SO_2-C_6H_4-O)_n] \qquad I$$

where n is an integer in the range from 50 to 150.

3. The membrane of claim 1 wherein the poly-2-oxazoline resin comprises polymer having the formula II

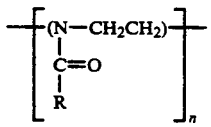

where n is an integer in the range from 500 to 5,000 and R is an alkyl group or an aryl group.

4. The membrane of claim 1 wherein the polyvinylpyrrolidone resin comprises polymer having a molecular weight of 700,000.

5. The membrane of claim 1 wherein the polyvinylpyrrolidone resin comprises polymer having the formula III

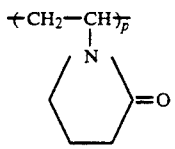

where p is an integer in the range from 360 to 6300.

6. The membrane of claim 3 wherein the resin comprises poly(2-ethyl)-2-oxazoline.

7. The membrane of claim 3 wherein the resin comprises a poly(2-phenyl)-2-oxazoline.

8. The membrane of claim 1 wherein the blend comprises an amount of polyethersulfone resin relative to the amount of poly-2-oxazoline resin such that the burst strength of the membrane is substantially greater than that of a comparable membrane lacking the poly-2-oxazoline resin.

9. The membrane of claim 1 wherein the blend comprises about 70 to 79 wt. % of polyethersulfone resin about 18 to 23 wt. % of poly-2-oxazoline resin, and about 3 to 7 wt. % of polyvinylpyrrolidone resin based upon the total amount of said resins included in the blend.

10. The membrane of claim 3 wherein the poly-2-oxazoline resin has a molecular weight in the range from 50,000 to 500,000.

11. The membrane of claim 1 wherein the blend comprises an amount of polyvinylpyrrolidone resin such that the hydrophilicity of the membrane stays unchanged after exhaustive extraction with water or alcohol.

12. The membrane of claim 1 wherein the blend comprises an amount of polyethersulfone resin relative to the amount of poly-2-oxazoline resin such that the tensile strength of the membrane is substantially greater than that of a comparable membrane lacking the poly-2-oxazoline resin.

13. A process of preparing a hydrophilic porous filtration membrane, which comprises forming a homogeneous blended solution of solutes comprising polyethersulfone resin, poly-2-oxazoline resin, and polyvinylpyrrolidone resin in a compatible solvent, forming the resulting solution in a film, quenching the film in a quenching medium, and drying the resulting film.

14. The process of claim 13 wherein the solvent is selected from N-methylpyrrolidone, dimethylformamide or a mixture thereof.

15. The process of claim 13 wherein the quenching medium is water.

16. A process for filtering an aqueous fluid comprising causing said fluid to flow through a filtration membrane according to claim 1 having a microporous matrix comprising a homogeneous copolymer blend of polyethersulfone resin, a poly-2-oxazoline resin, and polyvinylpyrrolidone resin.

17. A process according to claim 16 wherein the polyethersulfone resin comprises polymer having the formula I $$[(C_6H_4-SO_2-C_6H_4-O)_m] \qquad I$$

where m is in the range from 50 to 150.

18. A process according to claim 16 wherein the poly-2-oxazoline resin comprises polymer having the formula II

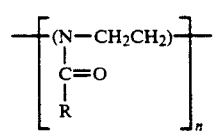

where n is an integer in the range from 500 to 5,000 and R is an alkyl group or an aryl group.

19. A process according to claim 16 wherein the poly-2-oxazoline resin comprises poly(2-ethyl)-2-oxazoline or poly(2-phenyl)-2-oxazoline.

20. A process according to claim 16 wherein the polyvinylpyrrolidone resin comprises polymer having the formula III

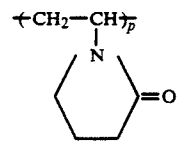

where p is an integer in the range from 360 to 6300.

* * * * *

UNITED STATES PATENT AND TRADEMARK OFFICE
CERTIFICATE OF CORRECTION

PATENT NO. : 5,178,765
DATED : January 12, 1993
INVENTOR(S) : Hu et al.

It is certified that error appears in the above-identified patent and that said Letters Patent is hereby corrected as shown below:

Column 10, line 18, delete "m is in the range" and insert --m is an integer in the range--.

Signed and Sealed this

Second Day of November, 1993

Attest:

BRUCE LEHMAN

*Attesting Officer*     *Commissioner of Patents and Trademarks*